May 31, 1932. J. D. CHRISTIAN 1,860,703
ELECTRIC POWER UNIT AND CONSTRUCTION FOR THE SAME
Filed Aug. 9, 1930 2 Sheets-Sheet 1

INVENTOR.
Joseph D. Christian
BY White Prost Fleh & Lothrop
ATTORNEYS.

May 31, 1932.    J. D. CHRISTIAN    1,860,703
ELECTRIC POWER UNIT AND CONSTRUCTION FOR THE SAME
Filed Aug. 9, 1930    2 Sheets-Sheet 2

INVENTOR.
Joseph D. Christian
BY
White, Prost, Flehr & Lothrop
ATTORNEYS.

Patented May 31, 1932

1,860,703

UNITED STATES PATENT OFFICE

JOSEPH D. CHRISTIAN, OF SAN FRANCISCO, CALIFORNIA

ELECTRIC POWER UNIT AND CONSTRUCTION FOR THE SAME

Application filed August 9, 1930. Serial No. 474,286.

This invention relates to a power unit such as a combined electric motor and speed reducer and particularly to a construction for the same.

For many industrial purposes it is desirable that standard electric motors be utilized because of their cheapness and availability. However, these motors are only furnished in certain sizes so that when a motor of abnormal speed or power is desired it becomes a special job. Speed reducers and transmission devices have been utilized to adapt the speed and power available from standard motors to the particular requirements which would otherwise require a special motor.

It is the principal object of the present invention to provide a construction in which an electric motor and a speed reducer are provided in a novel manner. In this connection, it is a feature that the size of the unit is reduced with the result that the unit can be readily utilized industrially under conditions where space is a material factor. Electric motors and speed reducers have been heretofore combined as individual units upon a separate base. In accordance with the present invention the unwieldiness and uncompactness of such units have been obviated with the result that a small compact units is available, thru certain novel features of construction.

A further object of the invention is to devise a construction of an electric motor and speed reducer by which the construction, operation and maintenance of both the units is simplified, facilitated and rendered more accessible.

Another feature of the invention is the provision of a power unit which can be modified to suit practically any industrial load without requiring any change other than a replacement of various of the units comprising the power unit.

The invention possess other advantageous features and objects, some of which with the foregoing will be set forth at length in the following, where I have outlined the preferred form of the speed reducer construction of my invention. It is to be understood that the form depicted is only the preferred form of the invention and that other forms and modifications can be adopted within the scope of the appended claims.

In the drawings, Figure 1 is a view in side elevation, the view being partly in section, of a speed reducer and electric motor unit construction embodying my invention.

My invention may be briefly characterized as comprising the combination of an electric motor unit and a speed reducer unit joined to provide a power unit having certain features. Certain novel features of construction of both the electric motor unit and the speed reducer unit and the housing which is used to contain these are also contemplated.

Figure 1:
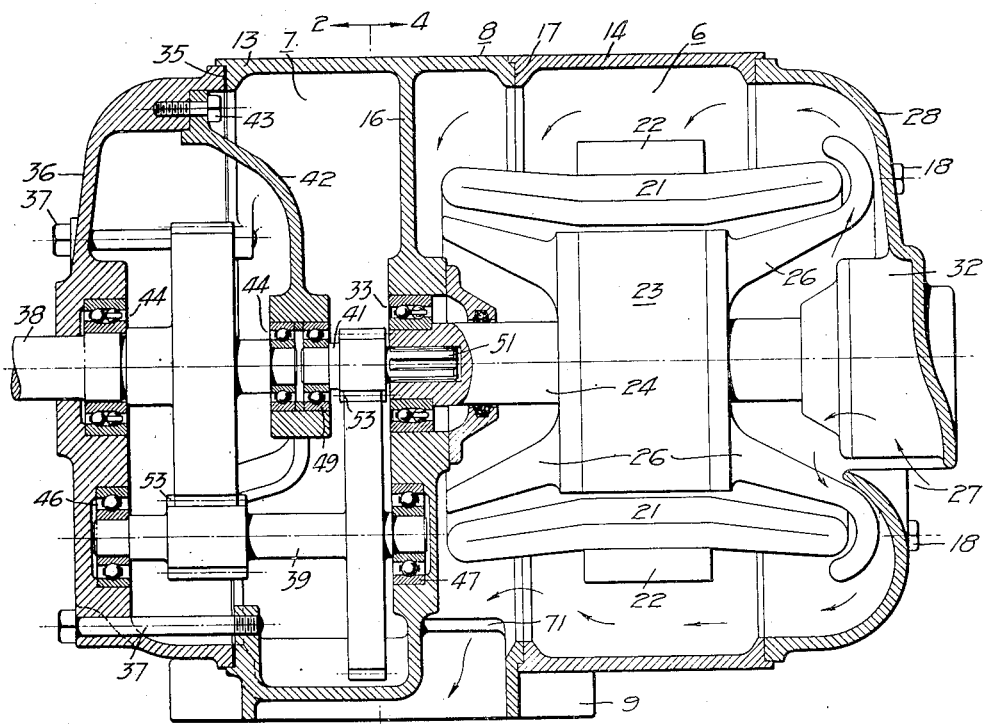

Referring particularly now to Figure 1 of the drawings, I provide an electrical motor unit generally designated as 6 and a speed reducer unit generally designated at 7 in a casing or housing 8. This housing is conveniently cylindrical in outline and has attached to it a base portion 9. This base portion includes several feet 11 in which longitudinal slots 12 are provided so that the unit can be adjusted and secured with respect to a supporting surface in a desired position.

The base portion is conveniently provided in the same relationship to the housing as ordinarily exists between the base portion of a motor and the motor shaft so that the unit can be set in place upon a supporting surface in place of a standard motor. The base portion dimensions and shaft relationships in electric motors have been standardized so that a manufacturer can substitute any one of several motors in a unit if the supporting surface on the unit is according to the standards adopted for motor bases.

In the construction illustrated in the drawings, the housing 8 is shown as including two portions, a first portion 13 in which the speed reducer is provided and a second portion 14 upon which the motor unit is provided. These portions are separated from each other by a plate or plate member 16, extending transversely of the housing to divide it off into separate and distinct chambers. Since the speed reducer ordinarily operates in the presence of a considerable lubricating medium, as oil, the plate and bearings provided in the plate are of such a nature that oil cannot pass, to any appreciable extent, through to the motor.

The housing portion 14, as is shown in Fig. 1 includes a grooved portion 17 adapted to cooperatively receive and engage an electric motor 6 such as a standard electric motor. The motor is secured to the housing 8 by through bolts 18 which extend from end bell 28 thru the motor to engage suitable ears (not shown) upon the housing portion 14. If desired the housing portion 14 can be extended, when undergoing manufacture, to provide the motor housing so that only the motor per se need be inserted in the housing.

Positioned within the portion 14 of the casing is a field winding or stator 21 of the electric motor. This stator or field winding can take any suitable form depending upon the type of motor installed. The stator is suitably positioned by brackets indicated at 22 which are so provided that a free air circulation through the motor can be maintained in a manner as will presently appear. Cooperatively disposed with respect to the field winding or stator is a rotor 23, positioned for rotation upon a shaft 24 which generally extends coaxial with respect to the housing. The rotor can also take whatever form is desired depending upon the particular type of electric motor desired. In the form shown in the drawings, the motor is of the induction type and the rotor 23 includes a plurality of fan blades 26 which are adapted upon rotation of the motor to draw in air through a louver 27 to maintain a circulation of air through the motor so that it is cooled.

To facilitate the assembly of the motor unit and its subsequent inspection and maintenance an end bell 28 is provided and is secured to the casing to enclose the motor. The end bell is conveniently secured by the bolts 18 which retain the motor unit in position. A bearing, indicated at 32, is provided in the end bell for supporting one end of the shaft 24 while an oil seal bearing 33 is provided for the opposite end of the shaft in the plate 16.

Figure 2:
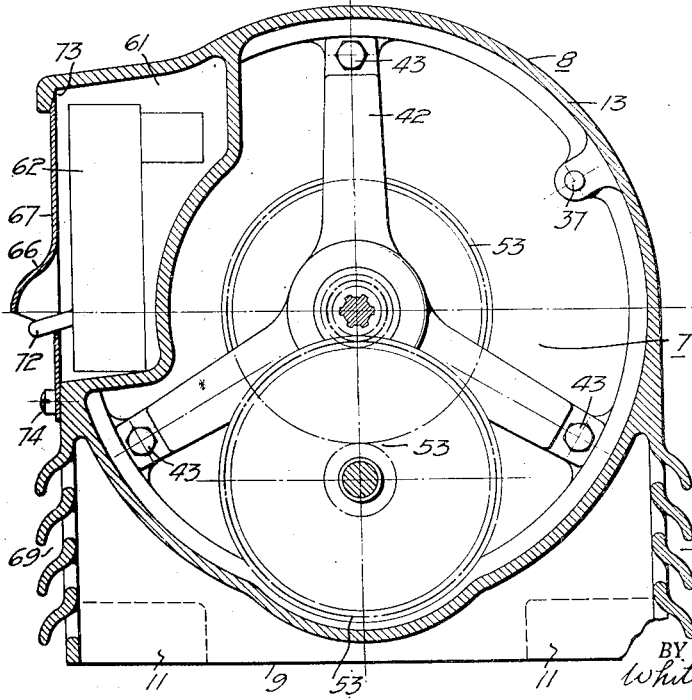
Fig. 2 is a section taken along the line 2—2 of Fig. 1 illustrating certain details of construction in the speed reducer.
Figure 3:
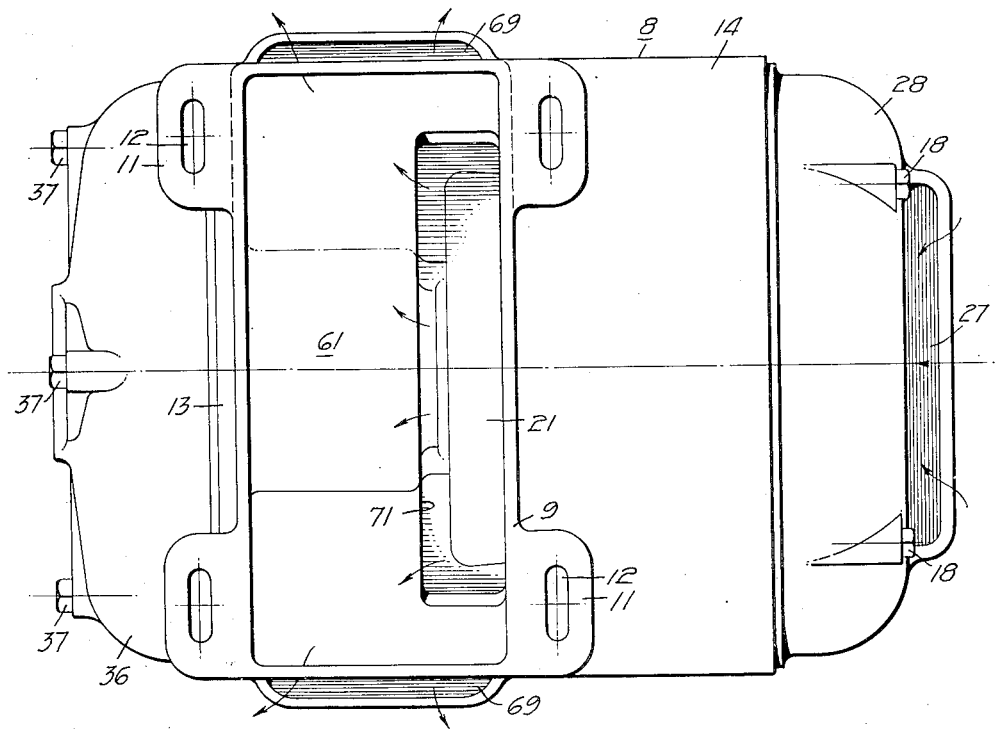
Fig. 3 is a plan view of the speed reducer and motor unit looking at the base of the unit.
Figure 4:
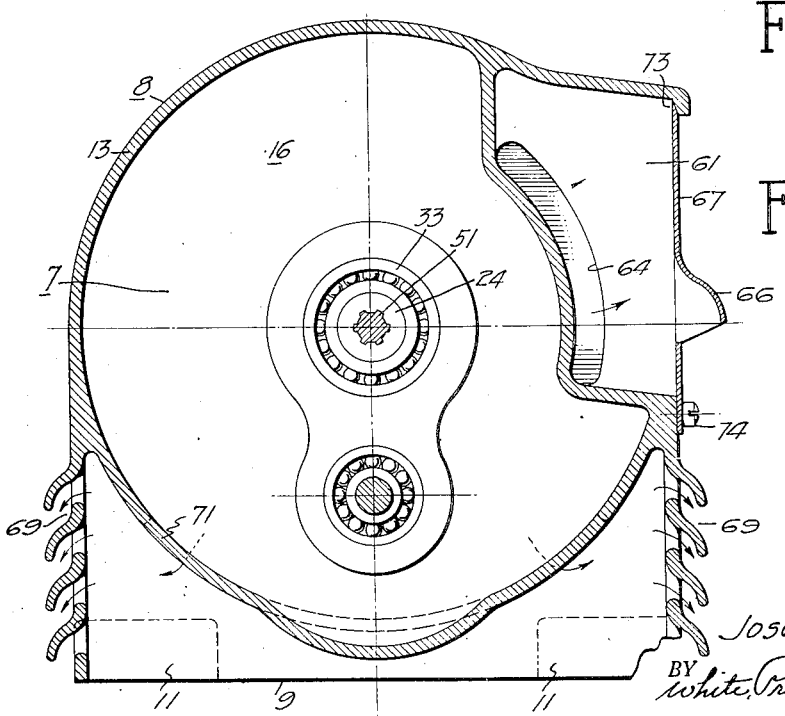
Fig. 4 is a section taken on the line 4—4 of Fig. 1.

The assembly of the speed reducer or motion transmitting unit is facilitated, as is the subsequent maintenance and inspection of this unit, by the provision of another end bell 36 adapted to be received by the casing 8 to enclose the portion 13. This end bell is secured by studs 37 which engage a portion of the casing, a gasket 35 being provided between the casing and the bell. Positioned within the portion 13 are a driven shaft 38, an idler shaft 39 and a counter shaft 41. These shafts are so arranged that the speed reducer or motion transmitting unit can be entirely removed without disturbing the motor upon removal of the end bell 36. Thus member 42 is provided within the casing and preferably is attached to the end bell as by studs 43 so that member 42 is removable therewith although it can be formed integrally with end bell 36 or casing 8. Member 42, as appears in Fig. 2, is preferably in the form of a spider. However, this is only the preferred form of member 42 and members of other shapes can be used. The term spider is intended to include such other forms as walls or plates.

The driven shaft 38 is positioned in bearings 44 positioned in the end bell and the spider so that the driven shaft is suitably mounted for rotation. The driven shaft extends beyond the end bell in substantially the same position as a motor shaft to carry a gear, pulley or other motion and power transmitting device. It is a feature of the invention that the shaft 38 be in the same relationship to the base as an electric motor shaft bears in a standard motor. This feature enables the power unit to be installed readily in place of any standard motor.

The counter shaft is conveniently carried in bearings indicated at 46 and 47 which are respectively provided in the end bell and in the plate 16. The counter shaft 41 is journaled at one end in a bearing 49 in the spider while its other end is splined as at 51 into the motor shaft 24. The splined connection serves to permit the motor to find its magnetic center and wobble or oscillate end-wise so that the motor shaft bearings are suitably lubricated and so that the rotor finds its preferred position. Any other type of connection than a splined connection can be utilized or the counter shaft can be formed integrally with the motor shaft as long as suitable provision is made to allow for the end play and wobble of the shaft. The construction illustrated is particularly adapted to the accommodation of a standard motor unit to a gear reducer as the spline connection is readily made with such a standard shaft.

Means, such as a plurality of herring bone gears indicated at 53, are provided upon each of the shafts to be readily removable and, also cooperatively with respect to each other so that a reduction or increase in the power or speed available from the motor shaft is transmitted through to the driven shaft 38. These gears, as previously mentioned, are preferably of the herring bone helical or spiral type, since the noise attendant upon their operation is very small.

The casing 8 includes a receptacle 61 formed therein adjacent to the plate 16 so that a control device indicated generally at 62 can be installed for the motor. The receptacle 61 is formed by a wall which is cast integral with the casing and which also separates the receptacle off from the interior portion of the casing so that oil in the power transmitting device does not come in contact with the control device. A portion of the air circulated to the motor is preferably brought into contact with the device by providing a slot 64 along one side of the receptacle so that air is forced thru the slot and over the device to pass outwardly through a louver 66 provided in a cover plate 67 positioned over the receptacle. Air not discharged thru the receptacle passes outwardly through several louvers 69 provided in the sides of the casing and also through an aperture 71 provided in the base, thus enabling the normal circulation of air through the motor to be maintained even though a portion of the motor structure has been done away with.

The control device usually includes a reset button indicated at 72 and other controls such as a temperature overload relay. Since air is passed from the motor directly into contact with the control, accuracy and responsiveness of the temperature overload is secured.

To protect the control device the cover plate 67 is dovetailed with the casing at 73, so that water cannot drain into the receptacle, and is secured by a stud 74. The louver 66 extends over the reset button 72 so that accidental entrance of material such as water is prevented.

It is believed to be apparent from the foregoing that a speed reducer and electric motor construction having novel features and numerous advantages both in the simplicity of construction, operation, ease of maintenance and low cost and also compactness and facility of installation has been arrived at.

Thus, with the construction illustrated, approximately seventeen different electric motors, between one and five horsepowers, each varying in speed and power, of various manufacturers can be attached to the casing so that the speed reducer provides as many different available speeds and horespowers. By removing the end bell 36 and changing the gears in the speed reducer, without any changes in construction, approximately two hundred, and thirteen different speeds and horespowers are available from the seventeen motor changes. The advantages of a construction making this possible are believed to be manifest, when the industrial desirability is kept in mind.

Further, by providing the motor shaft 24 so that it extends beyond the end bell 28 for a distance, another power takeoff is available. If desired, the motor shaft can be splined or otherwise modified so that connection to another speed reducer can be made, the motor then being held between the two speed reducers, thus making two different variable power takeoffs available.

Provision of base 9 on the speed reducer portion of the housing and extending power take off shaft 38 through end bell 36 enables the standard motor base to power take off shaft relationship to be made available so that the whole unit is capable of insertion in almost any place provided for a standard motor with the right low speed. Also, the mounting of the motor on the casing 8 and attachment of the whole motor-speed reducer unit by base 9 enables the torque to be cared for. It may be remarked that decrease in speed with transmission of the same horsepower causes a large increase in torque. The present invention enables this increased torque to be handled in an adequate and practical manner since base 9 can be designed to withstand it and resist transmission of the full power of the motor at low speed.

Subject matter disclosed but not claimed herein is the subject of a divisional and continuing application.

I claim:

1. In combination, a housing, an electric motor stator fixed in the housing, a rotor cooperatively positioned with respect to the stator, a member provided centrally of the housing for supporting an end of said rotor, a counter shaft in the housing, a driven shaft, a plurality of gears carried by said shafts to transmit rotation of said rotor to said driven shaft, an end bell, means for receiving said end bell on said housing to support an end of the driven shaft and an end of said counter shaft, and a spider carried by said end bell for supporting the driven shaft.

2. In a device of the character described, a housing, a plate member extending transversely of the housing and dividing the housing into two portions, a motor fixed in said housing and including a shaft in one housing portion, a bearing in the plate for supporting an end of said shaft, an end bell for closing another housing portion, a driven shaft supported in a bearing in the end bell, a spider in the other housing portion for supporting the other end of said driven shaft, a counter shaft supported in the other housing portion, and means carried by said driven shaft and said counter shaft to transmit motion of the first mentioned shaft to said driven shaft.

3. In a device of the character described, a housing, a plate member extending transversely of the housing and dividing the housing substantially into two portions, a motor including a shaft extending coaxially of one housing portion, a bearing for supporting the shaft, an end bell on the other housing portion, a driven shaft supported in a bearing in the end bell and extending coaxially of the other housing portion, a spider in the other housing portion and adapted to support the other end of the driven shaft, a counter shaft supported in the other housing portion, and means carried by said counter shaft and said driven shaft to transmit motion of the motor shaft to the driven shaft.

4. In a device of the character described, a housing, a plate member extending transversely of the housing and substantially dividing the housing into two portions, a motor including a shaft extending coaxially of one housing portion, a bearing for supporting the shaft, an end bell for the other housing portion, a driven shaft supported in a bearing in the end bell and extending coaxially of the other housing portion, a spider in the other housing portion and adapted to support the other end of the driven shaft, a counter shaft supported in the other housing portion, a stub shaft positioned in engagement with the motor shaft, and gear means on said counter shaft, said stub shaft and said driven shaft to transmit motion of the motor shaft to the driven shaft.

5. In a device of the character described, a motor shaft, means for supporting said shaft for rotation, a stub shaft positioned coaxially with said motor shaft, means for connecting said stub shaft to said motor shaft for driving by said motor shaft, a driven shaft coaxial with said stub shaft and said motor shaft, a spider for supporting an end of said driven shaft and an end of said stub shaft for rotation, and means for transmitting motion of said stub shaft to said coaxial driven shaft.

6. In a device of the character described, a casing structure, a power take-off shaft extending from said structure, means for journalling an end of said shaft in said casing structure, spider means within said casing structure for journalling another end of said shaft, gear means on said shaft between said journalling means, means for securing said spider means removably on said casing structure, a counter shaft journalled in said casing structure, a driving shaft extending into said casing from a motor unit, and other gear means positioned cooperably on said driving shaft and said counter shaft to drive said gear means on said power take-off shaft.

7. In a device of the character described, a casing structure, a power take-off shaft extending from said structure, means for journalling an end of said shaft in said casing structure, spider means fixed within said casing structure for journalling another end of said shaft, gear means on said shaft, a counter shaft journalled in said casing structure, a driving shaft extending into said casing coaxially with said power take-off shaft from a motor unit, and other gear means positioned cooperably on said driving shaft and said counter shaft to drive said gear means on said power take-off shaft.

8. In a device of the character described, a casing structure, a power take-off shaft extending from said structure, means for journalling an end of said shaft in said casing structure, spider means within said casing structure for journalling another end of said shaft, gear means on said shaft between said journalling means, means for securing said spider means removably on said casing structure, a counter shaft journalled in said casing structure, a driving shaft extending into said casing from a motor unit, means for journalling said driving shaft in said spider means, and other gear means positioned cooperably on said driving shaft and said counter shaft to drive said gear means on said power take-off shaft.

9. In a device of the character described, a casing structure, a power take-off shaft extending from said structure, means for journalling an end of said shaft in said casing structure, spider means within said casing structure for journalling another end of said shaft, gear means on said shaft between said journalling means, means for securing said spider means removably on said casing structure, a counter shaft journalled in said casing structure, a driving shaft extending into said casing coaxially with said power take-off shaft from a motor unit, means for journalling said driving shaft in said spider means, and other gear means positioned cooperably on said driving shaft and said counter shaft to drive said gear means on said power take-off shaft.

In testimony whereof, I have hereunto set my hand.

JOSEPH D. CHRISTIAN.

DISCLAIMER 1,860,703.—*Joseph D. Christian*, San Francisco, Calif. ELECTRIC POWER UNIT AND CONSTRUCTION FOR THE SAME. Patent dated May 31, 1932. Disclaimer filed September 29, 1934, by the assignee, *The Falk Corporation*.

Therefore, disclaims from the scope and meaning of said claims 1, 2, and 3 of said Letters Patent No. 1,860,703, any and all forms of "combination" or "device" therein defined, except wherein the "motor stator" of claim 1, or the "motor" of claims 2 and 3, is carried solely by the "housing" of said claims, so as to eliminate the "separate base" theretofore required and used in the prior combinations referred to in the sentence beginning in line 23 of page 1 of said Letters Patent.

Your petitioner further disclaims from the scope of meaning of claims 6, 7, 8, and 9 of said Letters Patent No. 1,860,703, any and all forms of "device" therein defined, except wherein the "casing structure" of said claims constitutes the sole support for the "motor unit" referred to therein, so as to eliminate the "separate base" theretofore required in prior combinations.

[*Official Gazette October 23, 1934.*]